United States Patent [19]

Lin

[11] Patent Number: 5,049,083

[45] Date of Patent: Sep. 17, 1991

[54] UNIVERSAL JOINT FOR TELEPHONE USE

[75] Inventor: Edward Lin, Taipei Hsien, Taiwan

[73] Assignee: Multi-Tooling Precision Industrial Co., Ltd., Taipei, Taiwan

[21] Appl. No.: 521,490

[22] Filed: May 10, 1990

[51] Int. Cl.⁵ .............................................. H01R 39/00
[52] U.S. Cl. ....................................... 439/26; 439/21; 439/676
[58] Field of Search ....................... 439/11, 13, 18–22, 439/24–26, 28, 29, 76, 676, 344

[56] References Cited

U.S. PATENT DOCUMENTS

| Re. 32,805 | 12/1988 | Engelmore et al. | 439/26 |
|---|---|---|---|
| 2,098,304 | 11/1937 | Nakich | 439/29 |
| 4,590,337 | 5/1986 | Engelmore | 439/21 |
| 4,764,121 | 8/1988 | Ditzig | 439/29 |
| 4,904,190 | 2/1990 | Plocek et al. | 439/29 |

*Primary Examiner*—David L. Pirlot
*Attorney, Agent, or Firm*—Browdy and Neimark

[57] ABSTRACT

The present disclosure is related to a universal joint adapted mainly for connecting a telephone receiver to an extension cord thereby the phone user can move along with the receiver at the extension cord's length without getting the extension cord twisted or tangled. The universal joint has a dome-shaped cap which is provided with an opening on the wall thereof and a peripheral flange disposed at the bottom thereof; and a tapered cord seat removably inserted in the opening has a number of obliquely extended resilient legs which are bent to form a number of contact protrusions at the bottom thereof; and a pc board having a number of concentric contact tracks in contact with the contact protrusions of the cord seat; and a bottom base having a concave into which the pc board and the dome-shaped cap with the cord seat attached thereto are located; and a horizontal rectangular extension projected from the bottom base and having a downwardly extended engagement chip is coupled to a phone receiver; thereby the extension cord engaged with the cord seat at one end can be freely rotated without being tangled with the help of the rotatable dome-shaped cap.

1 Claim, 4 Drawing Sheets

UNIVERSAL JOINT FOR TELEPHONE USE

FIELD OF THE INVENTION

The present invention relates to a universal joint mainly adapted for connection of a telephone receiver to an extension cord, which permit the telephone user to move around at the extension cord's length with the telephone receiver when making a phone call without getting the extension cord tangled or twisted.

It has been a disadvantage in a conventional telephone set that the extension cord connecting to the telephone receiver can be easily tangled or twisted when carried around by a phone user. The tangle of the extension cord is a result of both ends of the extension cord being fixed without freedom to rotate. People have to arrange the extension cords after a period of time to get the tangled cords properly extended. The quality of a telephone set can be greatly influenced as a result of poor connection of an extension cord to a telephone receiver because of the tangle of the extension cord.

The present inventor has noticed the problem and worked out a universal joint which includes a rotatable dome-shaped cap and a bottom base into which the cap can be rotatably engaged and the extension cord having an insertion head is removably coupled to the universal joint so that the extension cord connected to a telephone receiver can be prevented from being tangled or twisted.

SUMMARY OF THE INVENTION

The primary object of the present invention is to provide a universal joint mainly adapted for connection of a telephone receiver to an extension cord thereby the cord will not be tangled or twisted when the phone user moves around with the receiver in a limited distance, and the quality of the telephone signals can be improved.

The other object of the present invention is to provide a universal joint applied to connection of a telephone receiver to an extension cord, which is structured to have a dome-shaped cap having peripheral flange at the bottom thereof, and a botom base having a number of grooves, and a slidable cord seat, and a ring member which is employed to keep the cap and the bottom base engaged together, and a pair of nylon washers disposed between the flange of the cap. On the wall of the dome-shaped cap is disposed an opening for the insertion of the cord seat. A number of resilient legs are obliquely disposed on the cord seat, and a circular pc board with a number of concentric copper coated contact tracks is placed under the cord seat and in contact with the protrusions of the cord seat.

To better illustrate the structure and operation modes and features of the present invention, a number of drawings are given in company with a detailed description of the preferred embodiment, in which:

DETAILED DESCRIPTION OF A PREFERRED EMBODUNENT

Figure 1:
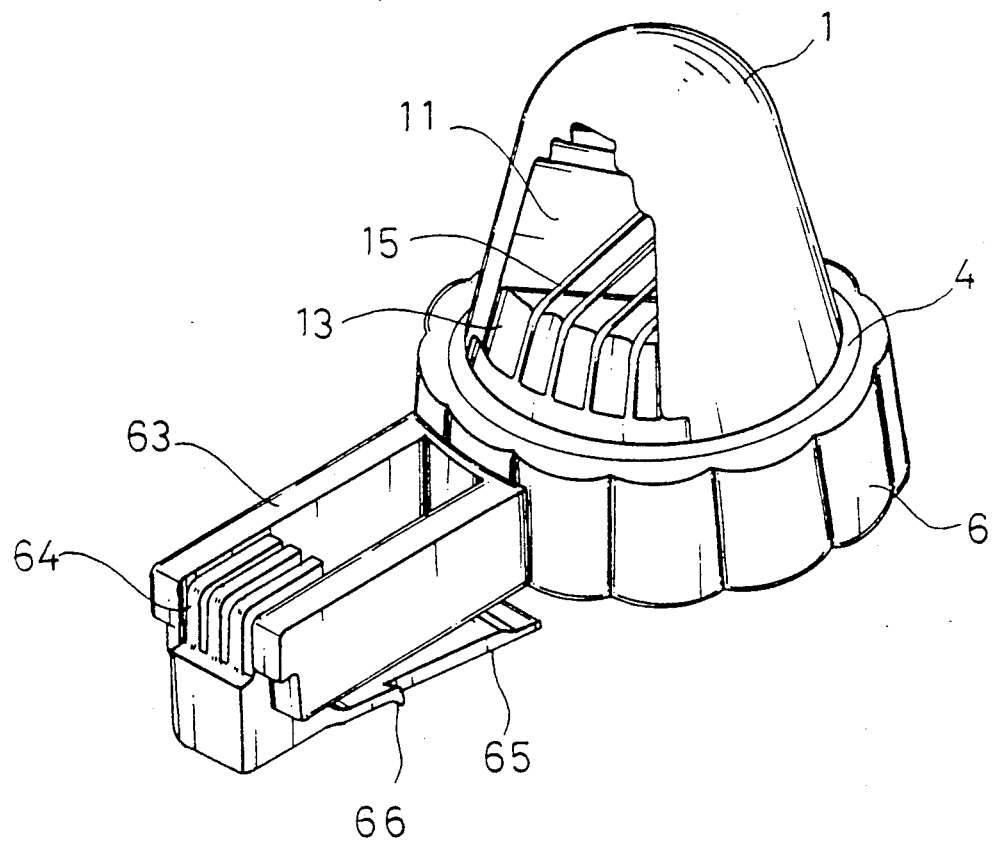
FIG. 1 is a perspective view of the present universal joint applied to a telephone set.
Figure 2:
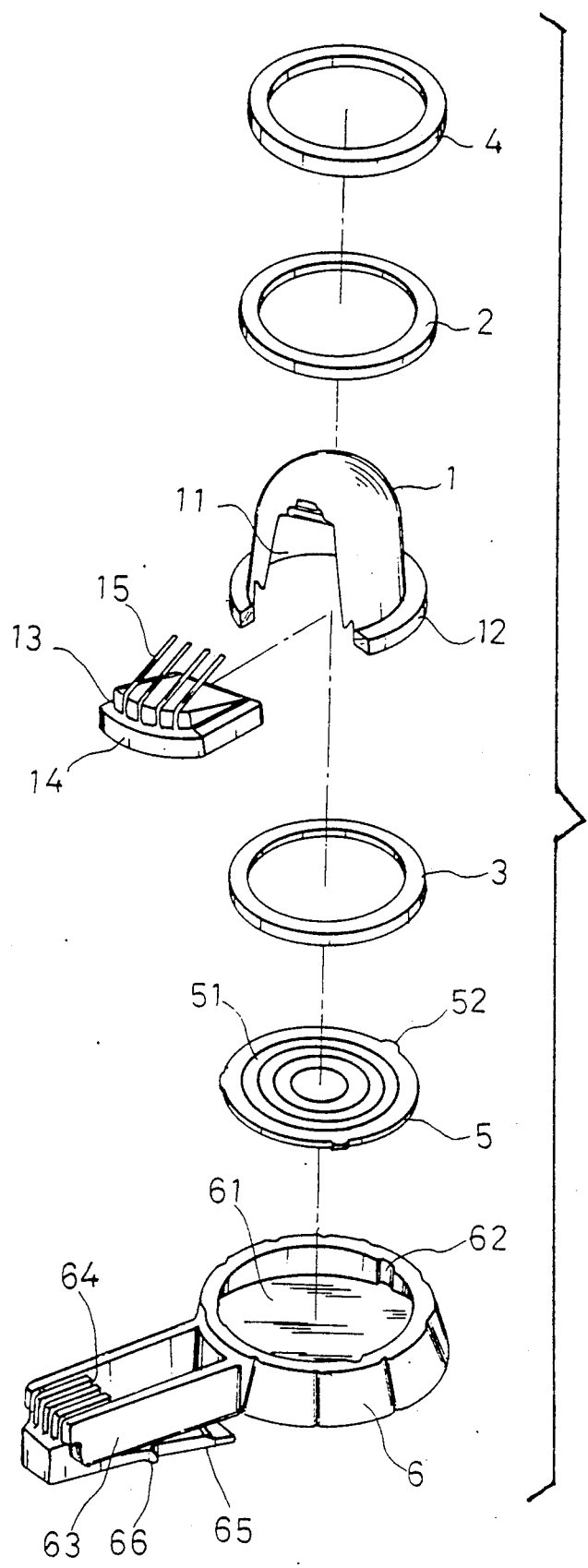
FIG. 2 is a perspective showing the exploded components of the present invention.
Figure 3:
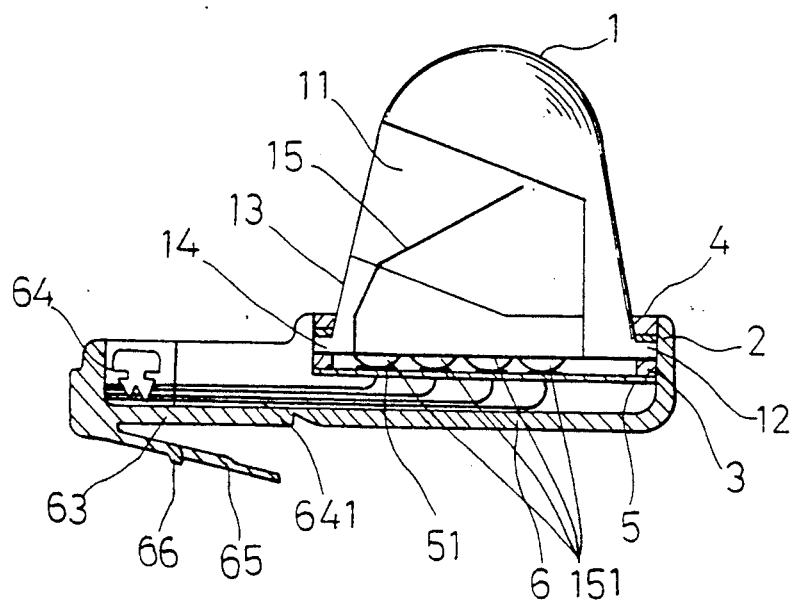
FIG. 3 is a sectional view thereof.

Referring to FIGS. 1, 2, 3, the dome-shaped cap 1 is provided with an opening 11 on the wall thereof and a peripheral flange 12 is disposed at the bottom thereof. A slidable cord seat 13 having a flange 14 disposed at the external bottom side is provided with a tapered top face and a number of resilient legs 15 which is upwardly extended at one end toward the inside of the cap 1 so that the insertion head 81 of the extension cord 8 is able to engage with the universal joint. The lower end of the resilient legs are bent in such a manner that a number of protrusions 151 are formed at the bottom of the cord seat 13. A circular pc board 5 having on the surface thereof number of concentric copper contact tracks 51 equal in number to the protrusions of the resilient legs 15 is disposed under the cord seat 13. A bottom base 6 has a circular concave 61 for disposition of the cap 1. Before the placement of the cap 1, the pc board 5 is first disposed into the concave 61, a number of locking protrusions 52 are disposed on the peripheral edge of the pc board 5 so that the board 5 can be fixed into te concave 61 by way of engagement to the grooves 62 on the inner wall of the bottom base 6. To the underside of the pc board 5 is connected a number of wires 641 disposed in the guide grooves 64 which is defined at the end of the horizontal rectangular extension 63 of the bottom base 6.

Figure 4:
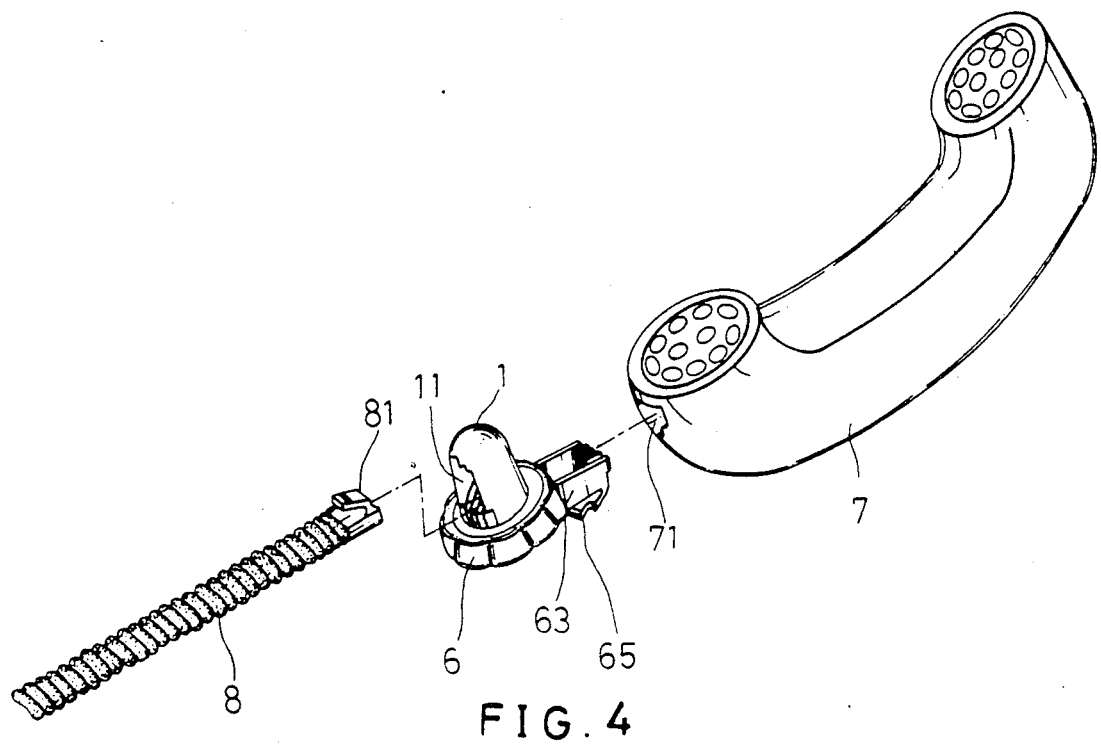
FIG. 4 is a diagram showing the relation ship of the present universal joint with a telephone receiver and an extension cord.
Figure 5:
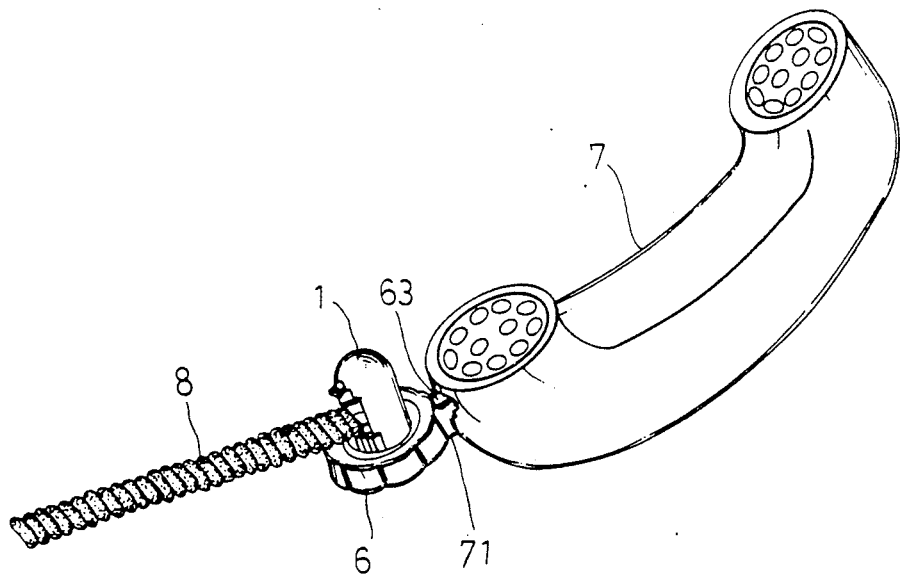
FIG. 5 is a diagram showing the application of the present universal joint to a telephone set.

The underside of the rectangular extension 63 is attached with a downward slanted engagement chip 65 having an engagement hook 66 so that the present universal joint can be detachably connected to a telephone receiver 7 having an engagement hole 71 thereon. As shown in FIGS. 4, 5, on top of the pc board 5 is first placed a second nylon ring washer 3, and then the cord seat 13, inserted in the cap 1; the cap is located on top of the second washer 3, and afterwards a first ring washer 2 with an engagement ring member 4 is disposed on top thereof. The assembly is located in the concave 61 of the bottom base 6, thereby the universal joint can be formed with the cap 1 rotatably operated. The protrusions under the cord seat are in contact with the copper contact tracks 51 of the pc board 5, permitting the cap 1 with the cord seat 13 attached thereto to rotate 360 degrees around.

It becomes apparent that the insertion head 81 at the end of the extension cord 8 can easily be plugged in the opening 11 of the dome-shaped cap 1 and in abutment against the cord seat 13 by way of the resilient legs 15 which are upwardly extended into the cap 1; and the horizontal extension 63 of the botom base is connected to the receiver 7 by engagement in the hole 71. So, when the receiver 7 is moved with the user and turned around, the extension cord 8 will not be tangled or twisted because of the freedom of the dome-shaped cap 1 which can be 360-degree rotatable with respect to the bottom base with the protrusions 151 at the bottom of the cord seat 13 in all-around contact with the copper coated contact tracks 51 of the pc board 5. With the tight abutment of the protrusions 151 against the contact tracks 51 of the pc board 5, the quality of communication can be greatly improved and maintained. Furthermore, the easy structure permits the production of the present universal joint at low cost and with less time and labor.

I claim:

1. A universal joint mainly adapted for use in connection of an extension cord to a telephone receiver comprising:

a dome-shaped cap having a peripheral flange at the bottom thereof and an opening disposed on a wall thereof;

a tapered cord seat having a flange at one side thereof with a number of resilient legs obliquely extended away from the flanged side with the underside of said cord seat having disposed thereon a number of contact protrusions formed by roundly bending said resilient legs; said cord seat cooperating with said opening of said dome-shaped cap;

a pair of ring washers, the first being disposed on top of said flange of said cap and the second being located thereunder in assembly;

an engagement ring member disposed on top of said ring washer and being in limiting engagement with said dome-shaped cap so to couple the same to a bottom base in assembly;

a circular pc board having a number of copper coated contact tracks disposed in concentric manner equal in number to said contact protrusions, and a number of locking protrusions disposed on the peripheral edge thereof;

a bottom base having a circular concavity into which are respectively inserted said circular pc board, said second washer, said dome-shaped cap with which said cord seat is attached, said first washer and said engagement ring member on the inner wall of said concavity, a number of grooves in correspondence with said locking protrusions of said pc board being disposed so that said pc board can be removably fixed in place; a horizontal rectangular extension projected from said bottom base being provided with a number of wire guide grooves at the end thereof and a downwardly slanted engagement chip being disposed under said horizontal extension, on which an engagement hook is defined so that the bottom base can be engaged with a hole on a telephone receiver;

said dome-shaped cap with said cord seat engaged therewith being removably located in said concavity of said bottom base; and said circular pc board being placed under said cord seat with said copper coated concentric contact tracks in abutment with said contact protrusions of said resilient legs; said horizontal rectangular extension being engaged with a telephone receiver and an insertion head of an extension cord being coupled to said cord seat in said opening of said dome-shaped cap, whereby the extension cord will not become tangled or twisted when said telephone receiver is repositioned as a result of said dome-shaped cap being rotatable with respect to said bottom base.

* * * * *